(12) United States Patent
Jaquette (10) Patent No.: US 7,003,111 B2
(45) Date of Patent: Feb. 21, 2006

(54) METHOD, SYSTEM, AND PROGRAM, FOR ENCODING AND DECODING INPUT DATA

(75) Inventor: Glen Alan Jaquette, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 868 days.

(21) Appl. No.: 09/977,161

(22) Filed: Oct. 11, 2001

(65) Prior Publication Data

US 2003/0072446 A1    Apr. 17, 2003

(51) Int. Cl.
G06F 17/00    (2006.01)
(52) U.S. Cl. .......................... 380/46; 380/44; 380/277
(58) Field of Classification Search ........ 380/277–286, 380/44–47
See application file for complete search history.

(56) References Cited

U.S. PATENT DOCUMENTS

| | | |
|---|---|---|
| 4,799,061 A | 1/1989 | Abraham et al. |
| 5,285,497 A | 2/1994 | Thatcher, Jr. |
| 5,319,710 A | 6/1994 | Atalla et al. |
| 5,321,749 A | 6/1994 | Virga |
| 5,398,283 A | 3/1995 | Virga |
| 5,416,841 A | 5/1995 | Merrick |
| 5,479,512 A | 12/1995 | Weiss |
| 5,642,421 A | 6/1997 | Gray et al. |
| 5,719,938 A | 2/1998 | Haas et al. |
| 5,805,700 A | 9/1998 | Nardone et al. |
| 5,809,145 A | 9/1998 | Slik et al. |
| RE36,181 E | 4/1999 | Koopman, Jr. et al. |
| 5,915,021 A | 6/1999 | Herlin et al. |
| 5,956,407 A | 9/1999 | Slavin |
| 5,963,642 A | 10/1999 | Goldstein |
| 5,974,144 A | 10/1999 | Brandman |
| 5,991,403 A | 11/1999 | Aucsmith et al. |
| 6,104,561 A | 8/2000 | Braithwaite et al. |
| 6,218,970 B1 | 4/2001 | Jaquette |

FOREIGN PATENT DOCUMENTS

| | | |
|---|---|---|
| EP | 924895 | 6/1999 |
| WO | 9848389 | 10/1998 |

OTHER PUBLICATIONS

Public-key cryptosystem over ring Z[√-3]/(2m) Shao Zu-Hua; Electronics Letters, vol.: 24, Issue: 2, Jan. 21, 1988.*
Key distribution system for digital video signal Xiao-Wen Yang; Zhi-Hang Zheng; Signal Processing, 1996.; 3rd International Conference on, vol.: 2, Oct. 14-18, 1996.*

(Continued)

Primary Examiner—David Jung
(74) Attorney, Agent, or Firm—David W. Victor; Konrad Raynes & Victor LLP (57) ABSTRACT

Provided is a method, system, and program for encoding and decoding input data. A key is generated comprising a list of a plurality of binary values, wherein the key is available to a user during decoding. The input data is encoded by using the key to initialize a replacement list. A determination is made whether to replace strings in the input data with a string reference to a matching string value, wherein the input data not replaced with reference to one matching string value comprises one or more literals. Each literal is replaced with a literal reference to one entry in the replacement list matching the literal. The encoded input data is decoded by accessing the generated key in response to user input and using the accessed key to decode the literals replaced with literal references to entries in the replacement list.

36 Claims, 8 Drawing Sheets

OTHER PUBLICATIONS

Perceptual cryptography on MPEG-1 layer III bit-streams Torrubia, A.; Mora, F.; Consumer Electronics, 2002. ICCE. 2002 Digest of Technical Papers. International Conference on, Jun. 18-20, 2002.*

U.S. Appl. No. 09/977,159, filed on Oct. 11, 2001, entitled "Method System and Program for Securely Providing Keys to Encode and Decode Data in a Storage Cartridge", invented by G.A. Jaquette.

IBM, Corp., "A Fast Hardware Data Compression Algorithm and Some Algorithmic Extensions", Journal of Research and Development, vol. 42, No. 6, 1998, pp. 1-13.

Lewis, Harry A. and Larry Denenberg. "Lempel-Ziv Encoding." in: *Data Structures & Their Algorithms*. Harper Collins Publishers, 1991.

Quarter-Inch Cartridge Drive Standards, Inc., "Adaptive Lossless Data Compression (ALDC)", QIC-154, Revision A, Mar. 10, 1994.

SCMA Standardizing Information and Communication System, Streaming Lossless Data Compression Algorithm—(SLDC), Second Draft, Dec. 2000.

Microsoft Corp., "Encrypting File System for Windows 2000." Copyright 1998 Microsoft Corporation.

* cited by examiner

FIG. 1

MRU Key

Scrambled MRU Key

METHOD, SYSTEM, AND PROGRAM, FOR ENCODING AND DECODING INPUT DATA

RELATED APPLICATION

This application is related to the copending and commonly assigned patent application entitled "Method, System, and Program for Securely Providing Keys to Encode and Decode Data in a Storage Cartridge", which patent application is incorporated herein by reference in its entirety.

BACKGROUND OF THE INVENTION

1. Field of the Invention

The present invention relates to a method, system, and program for encoding and decoding input data.

2. Description of the Related Art

It is often desirable to encrypt and compress data to both protect the data and optimize the use of storage of the data. Performing encryption and compression as well as decompression and decryption on very large data sets, such as an entire tape cartridge which can comprise 100 gigabytes (GB), can be computationally expensive and can take a considerable amount of time.

Moreover, the compression and encryption operations are usually performed sequentially in separate steps. The data is first compressed and then encrypted because encrypted data cannot typically be compressed. Performing compression and encryption sequentially requires scanning the data twice, which requires still further computational resources and time. Still further, compression may be performed by dedicated integrated circuits, whereas most popular encryption algorithms, such as the public/private key encryption and cipher schemes, are typically implemented using software, which is slower than using a dedicated integrated circuit.

Because providing both compression and encryption of data is an important product feature desired by consumers, there is a need in the art for improved techniques for performing both compression and encryption.

SUMMARY OF THE PREFERRED EMBODIMENTS

Provided is a method, system, and program for encoding and decoding input data. A key is generated comprising a list of a plurality of binary values, wherein the key is made available to a user to enable decoding. The input data is encoded by using the key to initialize a replacement list. A determination is made of whether to replace strings in the input data with a string reference to a matching string value, wherein the input data not replaced with reference to one matching string value comprises one or more literals. Each literal is replaced with a literal reference to one entry in the replacement list matching the literal. The encoded input data is decoded by accessing the generated key in response to user input and using the accessed key to decode the literals replaced with literal references to entries in the replacement list.

In certain implementations, each string reference comprises a copy pointer to a previous instance of the string in a history buffer generated while scanning the input data. Alternatively, each string reference addresses one entry in a compression dictionary comprising strings repeated in the input data.

In further implementations, the replacement list comprises a most recently used (MRU) list. After replacing one literal with one literal reference to one entry in the replacement list during encoding, the entry matching the replaced literal is promoted to a first entry in the replacement list.

Still further, encoding the input data further comprises using at least one random number generator to generate random numbers to encrypt the encoded input data and then using the at least one random number generator to generate random numbers to decrypt the encoded data.

The described implementations provide a technique to compress and encrypt data by encoding input data with references to a matching string value or replacement list comprising a key, wherein computers must provide the key in order for the decoder to decrypt/decompress the data. The extent to which the user can control or prevent unauthorized access or decrypting of the key determines the extent of the security provided by the encoding.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
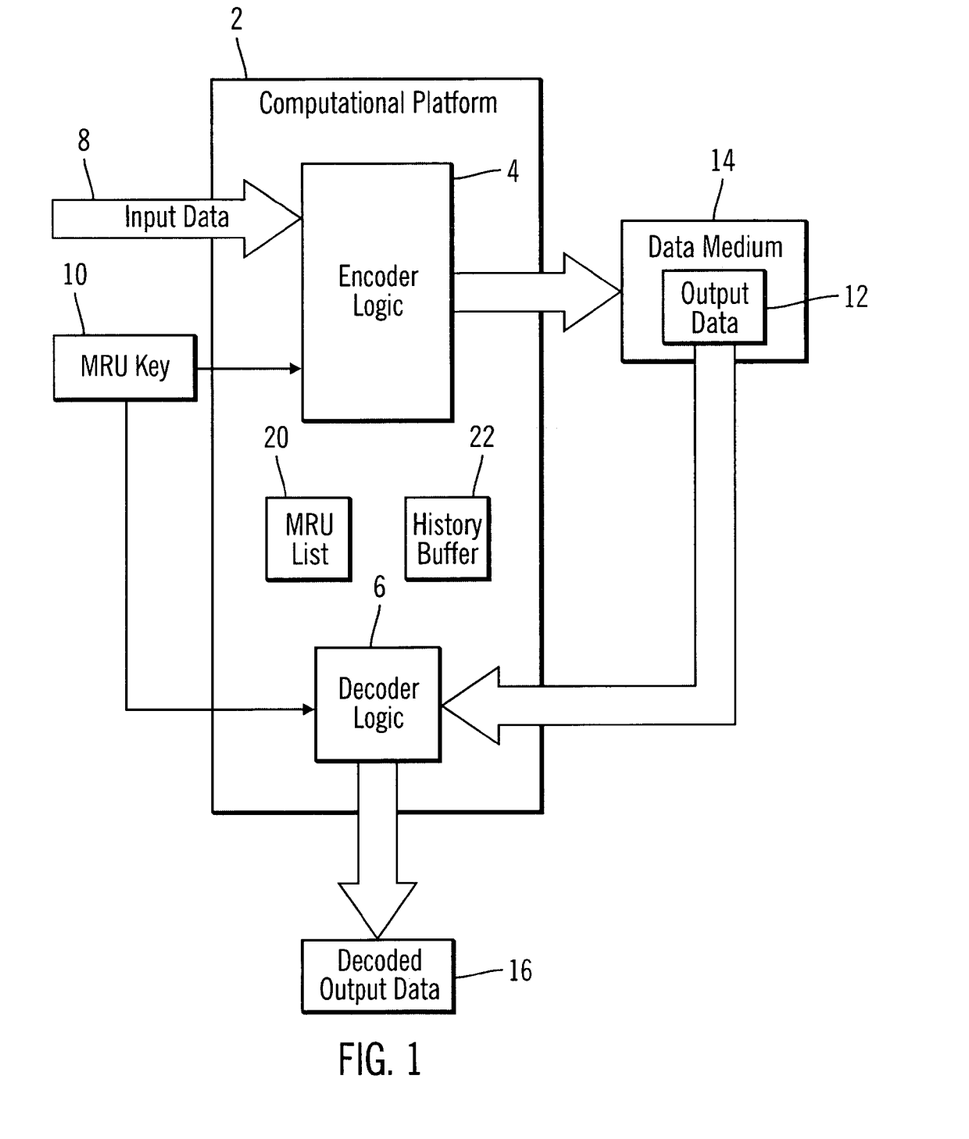
FIG. 1 illustrates a computing environment in accordance with the preferred embodiments of the present invention.

FIG. 1 illustrates a computing environment in which aspects of the invention are implemented. A computational platform 2 includes encoder logic 4 and decoder logic 6. The computational platform may comprise a dedicated integrated circuit, such as an Application Specific Integrated Circuit (ASIC) or other digital hardware component in which the encoder logic 4 and decoder logic 6 are implemented. Additionally, the computational platform 2 may comprise a processor based platform in which the encoder 4 and decoder 6 logic are implemented as code in a computer readable medium and executed by a processor (not shown).

Figure 2A:
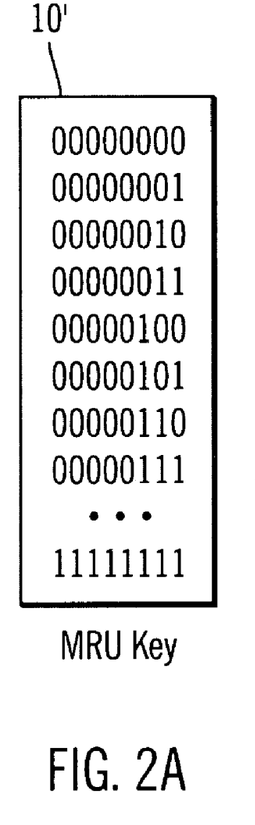
FIGS. 2*a, b* illustrate keys used to encode data in accordance with implementations of the invention.
Figure 2B:
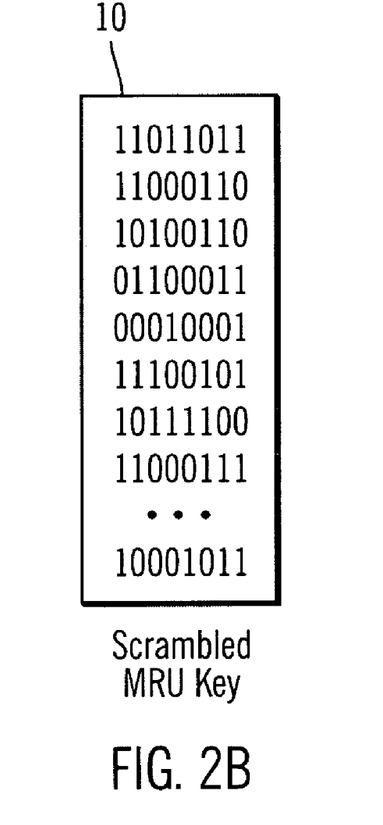

The encoder logic 4 receives an input data stream 8 and a Most Recently Used (MRU) key 10, such as that shown in FIG. 2*b*. FIG. 2*a* illustrates an implementation of the MRU key 10' comprising a 256 byte key that has 256 one byte entries. The MRU key 10' includes every possible one byte value. In FIG. 2*a*, the MRU key 10' entries are shown in increasing order. In certain implementations, as shown in FIG. 2*b*, the ordering of the entries in the initial MRU key 10' are scrambled in a random manner to avoid an obvious pattern, such as an increasing order, to produce a scrambled MRU key 10. Such a scrambled MRU key 10 can be used as an encryption/decryption key to the data.

In FIG. 1, the encoder logic 4 uses the scrambled MRU key 10 to generate compressed and encrypted output data 12 in the manner described below. The encoded output data 12 is maintained in a computer readable data medium 14, which may comprise a magnetic, optical or electronic storage; or comprise a data transfer medium such as signals propagating through space or through a network. The decoder logic 6 receives as input the scrambled MRU key 10 and the compressed/encrypted output data 12, and generates decoded output data 16, e.g., decompressed and decrypted, that comprises the input data stream, with the exception that if the encoder 4 and decoder 6 logic use lossy compression algorithms, some of the original input data 8 may have been simplified to the point where some detail was lost.

In certain implementations, the encoder logic 4 uses a lossless Lempel-Ziv (LZ) variable length encoding procedure. In one implementation, the encoder 4 uses the LZ1 Adaptive Lossless Data Compression (ALDC) algorithm. The LZ1 algorithm achieves data compression by using a history buffer that the encoder 4 and decoder 6 initialize and update in the same manner. In LZ1, if a string, i.e., two or more sequential bytes, in the input data 8 currently being scanned matches one previously scanned string which is still in the sliding history buffer, the encoder 4 replaces the currently scanned string with a reference, referred to as a copy pointer, to the previously scanned string in the history buffer, specifying a location and a byte count or length. Because the copy pointer can comprise fewer bits than the string being replaced, compression is achieved. If a byte is encountered which cannot be output as a continuation of a previous copy pointer, or as a first byte of a new copy pointer, it is output instead separately in what is called a literal. A literal in standard ALDC is simply the input byte prepended with a "0" to distinguish it from a copy pointer, to which is prepended with a "1". A literal byte is output for those bytes in the input data 8 that were not part of strings replaced with references or pointers to a matching string value in a sliding history buffer, in the case of LZ1 compression, or a compression dictionary, in the case of LZ2 compression.

In certain implementations, the encoder 4 logic encodes the literal bytes not part of strings replaced with copy pointers using the compression scheme described in the commonly assigned U.S. Pat. No. 6,218,940 entitled "Literal Handling in LZ Compression Employing MRU/LRU Encoding", which patent is incorporated herein by reference in its entirety. To compress the literals, the encoder 4 maintains an MRU list 20, which in its initial state is set to the MRU key 10. Upon scanning a literal, the encoder 4 determines the entry in the MRU list 20 having the byte value matching the input byte value. The encoder 4 then replaces the scanned literal with a reference addressing the entry in the MRU list 20 including the matching byte value. The matching value in the referenced entry of the MRU list 20 is then promoted to the top, or most recently used end, of the MRU list 20, where its reference address changes to the first entry in the MRU list 20.

To compress the input data 8 stream using LZ1 compression techniques, the encoder 4 maintains a sliding history buffer 22, which includes the strings in the input data 8 referenced by the generated copy pointers. To decode data, the decoder 6 would identically update and utilize the MRU list 20 and history buffer 22 when performing the inverse operations of the encoder 4 to replace the copy pointers referencing the history buffer 22 with the referenced string and replace references to the MRU list 20 with the byte value in the referenced entry in the MRU list 20 to produce the original input data 8 as part of a decoding operation.

In certain implementation, all copy pointers are signified as such by a prepended binary "1". The encoder 4 replaces a literal byte with one of the following values:

If the entry in the MRU list 20 including the byte value matching the literal is one of the first 64 entries, then the reference code comprises "00" plus a 6 bit address identifying the referenced entry in the first 64 entries of the MRU list 20, which comprises an eight bit reference code.

If the referenced entry in the MRU list 20 including the byte value matching the literal is one of the $65^{th}$ to $128^{th}$ entries, then the reference code comprises "010" plus a 6 bit address identifying the referenced entry in the $65^{th}$ to $128^{th}$ entries of the MRU list 20, which comprises a nine bit reference code.

If the referenced entry in the MRU list 20 including the byte value matching the literal is one of the $129^{th}$ to $256^{th}$ entries, then the reference code comprises "011" plus a 7 bit address identifying the referenced entry in the $129^{th}$ to $256^{th}$ entries of the MRU list 20, which comprises a ten bit reference code.

The above described scheme for coding the references to the MRU list 20 that replace the literals in the input data 8 optimize compression, because the fewest number of bits, 8, are used to represent the most used MRU list 20 entries, the next fewest number of bits, 9, are used to represent the next most used MRU list 20 entries, and the most number of bits, 10, are used to represent the least recently used MRU list 20 entries.

Figure 3:
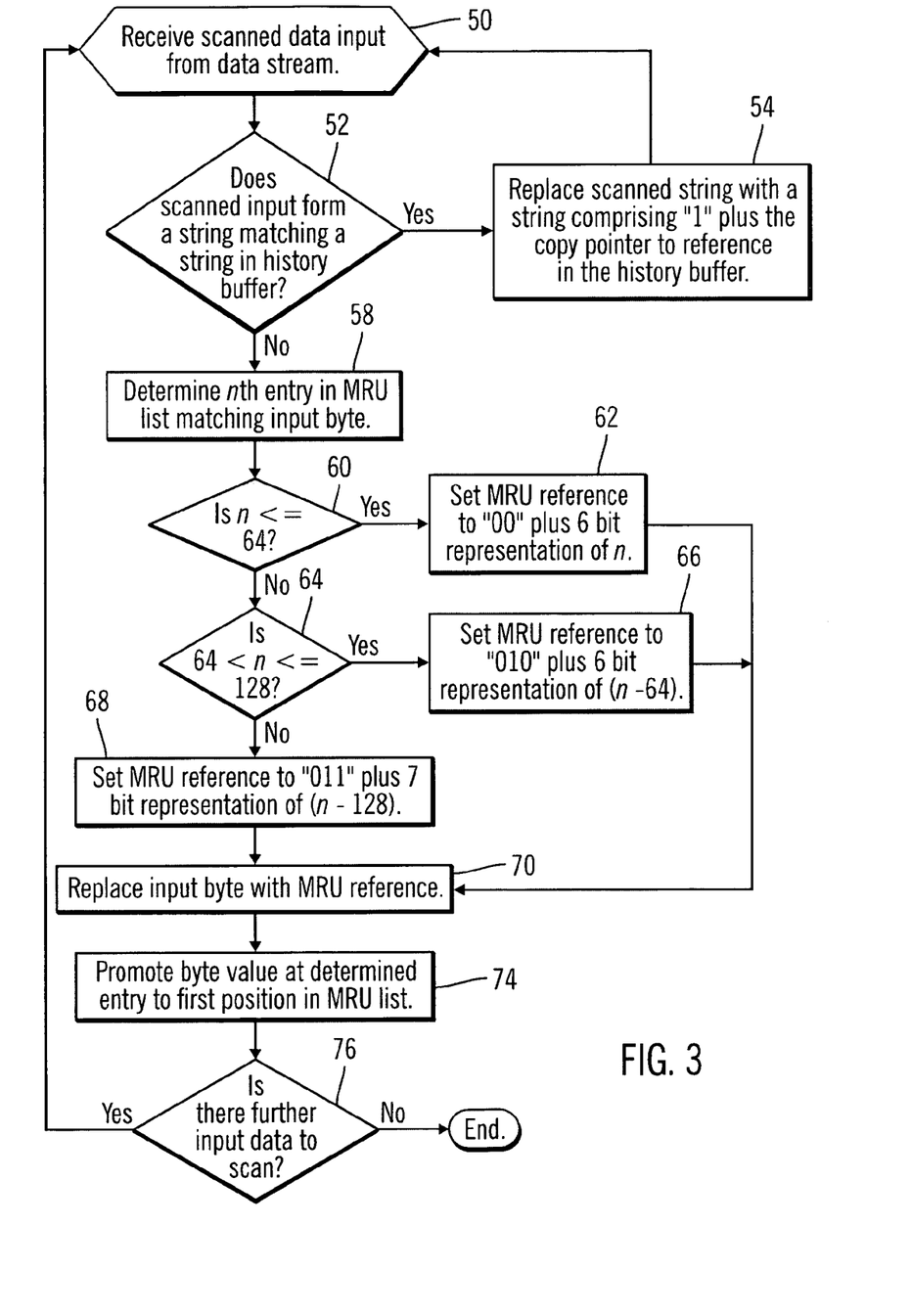
FIG. 3 illustrates logic to encode data in accordance with implementations of the invention.

FIG. 3 illustrates logic implemented in the encoder 4 to encode the input data 8 in accordance with the described implementations. Upon receiving (at block 50) data from the input data 8 stream, the encoder 4 uses LZ1 encoding techniques known in the art to determine (at block 52) whether the scanned input data forms a string that matches one previously scanned string in the history buffer 22. If so, the encoder 4 replaces (at block 54) the scanned string with a copy pointer to the matching string in the history buffer 22. The encoder 4 would update the history buffer 22 in a manner known in the art according to the LZ1 algorithm. Otherwise, if a byte is encountered which cannot be output as a continuation of a previous copy pointer referencing history buffer 22, or as a first byte of a new copy pointer, it is output by encoder 4 instead separately, in what is called a literal, as is shown in blocks 58 through 76. At block 58, the encoder 4 determines whether (at block 58) the nth entry in the MRU list 20 that matches the literal being considered. If (at block 60) n is less than 65, then the encoder 4 sets (at block 62) the MRU reference to "00" plus the six bit binary address of n, i.e., the offset of the entry in the first 64 entries of the MRU list 20. If (at block 64) n is between the 65 and 128, inclusive, then the encoder 4 sets (at block 66) the MRU reference to "010" plus the six bit binary address of n minus 64, which is the offset to the nth entry in the section of the MRU list 20 including the $65^{th}$ to $128^{th}$ entries. If (at block 64) the n is greater than 128, then the encoder 4 sets (at block 68) the MRU reference to "011" plus the seven bit binary address of n minus 128, which is the offset to the nth entry in the section of the MRU list 20 including the $129^{th}$ to $256^{th}$ entries. After setting the MRU reference, the encoder 4 replaces (at block 70) the literal with the MRU reference in the output data 12. The value at the nth entry in the MRU list 20 is then promoted (at block 74) to the first entry in the MRU list 20. Thus, future references to this value in the MRU list 20 will reference a different address due to the promotion. If (at block 76) there is further input data, control proceeds back to block 50 to scan and encode further input data.

To decode the encoded output data 12, the decoder 6 would set the MRU list 20 to the value of the MRU key 10 and the history buffer 22 to the initial value according to the LZ1 algorithm and then scan the output data 12. If the first bit of a reference code is "1", then the reference code is a copy pointer, whose data can be determined from the current state of the history buffer 22. If the first bits are one of the literal value indicators, e.g., "00", "010" or "011", then the decoder 6 would use the MRU reference to access the entry in the current MRU list 20 within the section of the MRU list 20 associated with the prepended value, i.e., the first 64 entries if the prepended value is "00", the second 64 entries if the prepended value is "010" and the last 128 entries if the prepended value is "011". In this way, the reference code for the literal is used to access the entry in the MRU list 20 and replace the MRU reference in the output data 12 with the value in the accessed MRU list 20 entry. The decoder 6 would perform the same actions as the encoder 4 in updating the MRU list 20 and the history buffer 22 while processing the output data 12. The decoder logic 6 would generate the decoded output data 16.

Figure 4:
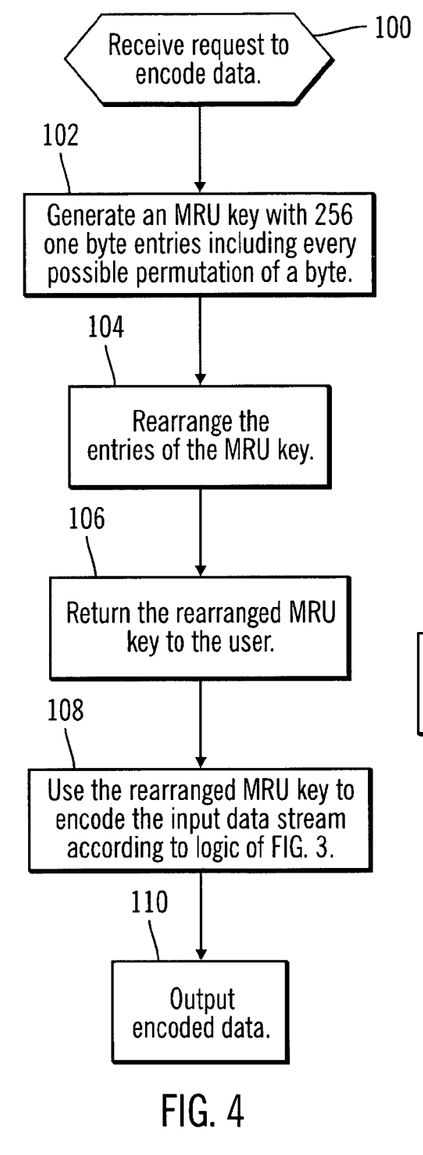
FIGS. 4 and 5 illustrate logic for the user to generate and maintain a key to encode and decode the data in accordance with implementations of the invention.

FIG. 4 illustrates logic implemented in the encoder 4 to allow a user to create an MRU key 10 that can be used as an encryption key to encrypt the input data 8. Control begins at block 100 with the encoder 4 receiving a request from a user to encode data. In response, the encoder 4 generates (at block 102) an MRU key 10 with 256 one byte entries including every possible binary permutation of an eight bit byte. The encoder 4 then rearranges (at block 104) the entries in the MRU key 10. The encoder 4 may user a random number or other random data to reorder the entries. The result is a randomized MRU key 10. Alternatively, the encoder 4 may receive a secret password from the user and use the value of the password to generate an ordering of the entries in the MRU key 10. The encoder 4 then returns (at block 106) the rearranged or generated MRU key 10 to the user. At block 108, the encoder 4 then encodes the data using the logic of FIG. 3 and the generated MRU key 10 and outputs (at block 110) the encoded data. The user may store the MRU key 10 for use to decode the data according to the logic of FIG. 5, or alternately just some password used to generate the key may be stored so that it can be regenerated for decryption.

Figure 5:
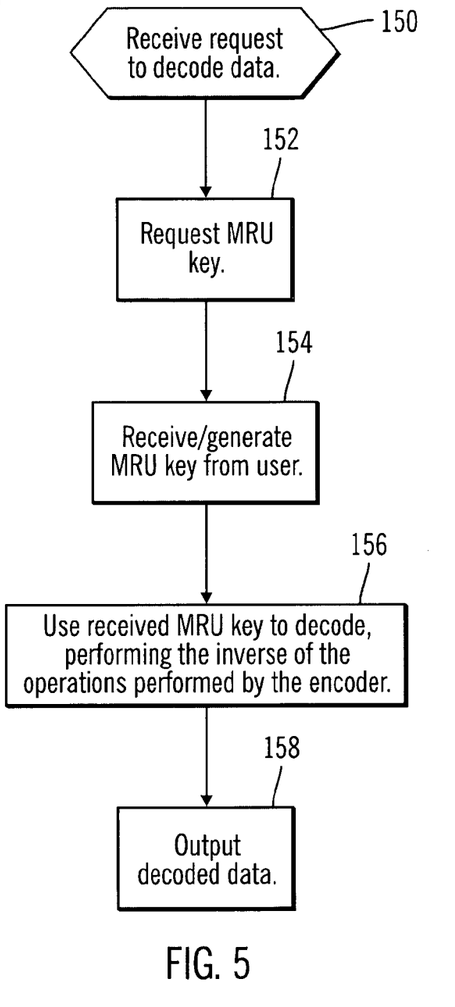

Because the output data 12 was encoded using an unascertainable MRU key 10, the output data 12 is effectively encrypted, unless one can obtain the MRU key 10. FIG. 5 illustrates logic implemented in the decoder logic 6 to decode the output data 12. Control begins at block 150 where the decoder logic 6 receives a request to decode output data 12. The decoder logic 6 requests (at block 152) the MRU key 10 from the user. The user may provide the MRU key 10 on a removable medium, such as a diskette, memory stick, etc., accessible to the decoder 6. Alternatively, in implementations where the encoder logic 4 generated the MRU key 10 from a user password, the decoder logic 6 may request the password and generate the MRU key 10 from the user entered password. Upon receiving (at block 154) the MRU key 10 from the user, the decoder logic 6 then uses the received MRU key 10 to decode (at block 156) the output data 12 performing the inverse of the operations performed by the encoder 4 described with respect to FIG. 3 and generate (at block 158) decoded output data 16.

The described encoder logic 4 and decoder logic 6 may be utilized in many environments. For instance, a storage device, such as a tape drive or hard disk drive may include both the encoder 4 and decoder 6 logic to use to encode/encrypt and decode/decrypt data in the storage device, e.g., hard disk drive or tape cartridge. Alternatively, the encoder logic 4 may reside on one computer and the decoder logic 6 may reside on another computer, whereby a user at one computer would encode data and generate the MRU key 10, then transmit the MRU key 10 to a user at another computer including the decode logic 6 to use to decode/decrypt the data. For security purposes, the user may transfer the MRU key 10 on a removable storage device, e.g., diskette, memory stick, etc., to the other user. Alternatively, the user may encrypt the MRU key 10 with a password or using public/private key encryption and transfer to the other user, who would then decrypt the MRU key 10 using the password or asymmetric public/private key.

With the logic of FIGS. 4 and 5 both compression and encryption are accomplished in the same set of operations, such that the compressed output data 12 is effectively encrypted if third parties cannot ascertain the MRU key 10. The described implementations substantially improve the performance of a combination compression and encryption operation because the encoder logic does not need to separately compress the data and then separately encrypt the data. Instead, with the logic of FIGS. 4 and 5 both compression and encryption, as well as the inverse operations of decompression and decryption, are performed when scanning the input data, thereby requiring only one scan of the output data 12 to perform both compression/decompression and encryption/decryption.

Figure 6:
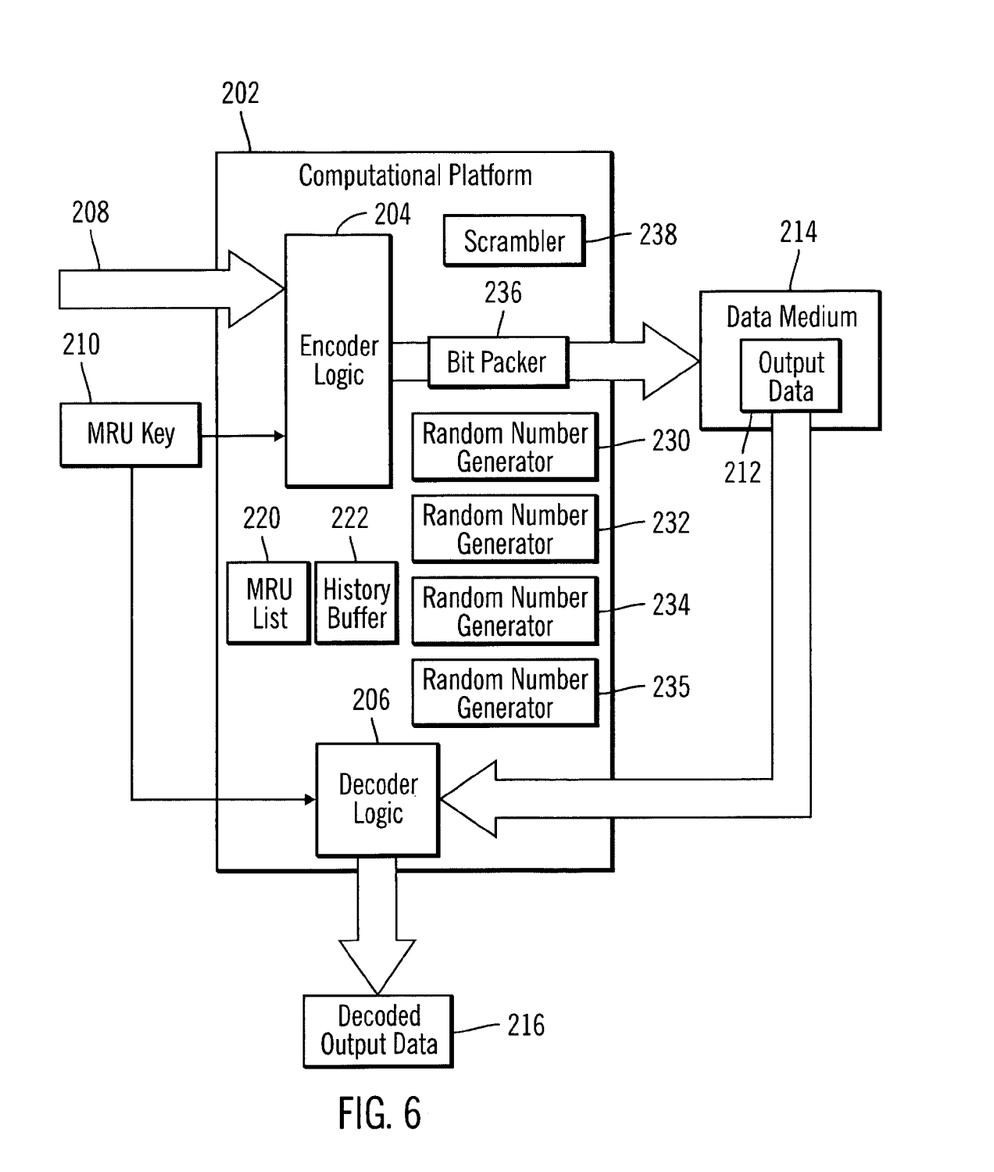
FIG. 6 illustrates an additional computing environment in accordance with the preferred embodiments of the present invention.

FIG. 6 illustrates a further implementation where additional operations are performed to further encrypt the input data to increase data security and further confound third parties improperly attempting to decode the data. The implementation of FIG. 6 includes all the components of FIG. 1 and additionally includes four random number generators (RNG) 230, 232, 234, and 235, which are used by the encoder 204, decoder 206, and bit packer 236. The random number generators 230, 232, 234, and 235 implement pseudo random number generator algorithms known in the art. Further, a scrambler 238 performs scrambling operations in response to the value of an input pseudo random number from one of the random number generators 230, 232, 234, or 235. A bit packer 236 gathers bits of the encoded data and packs the bits into N bit packages, such as 32 bit packages, to generate into the output data 212 in a manner known in the art.

Figure 7:
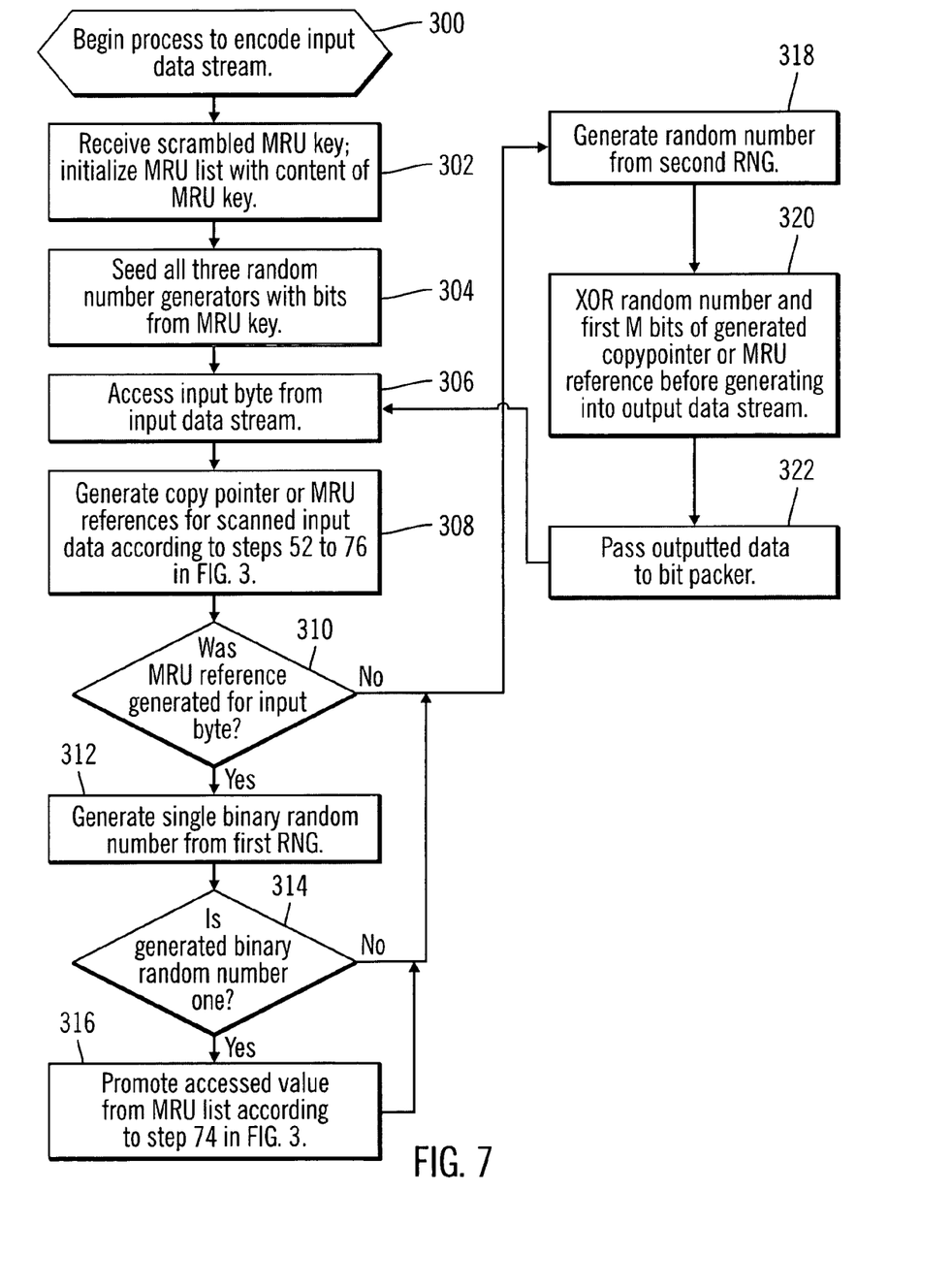
FIGS. 7 and 8 illustrate logic to encode data in accordance with implementations of the invention.

FIG. 7 illustrates logic implemented in the encoder 6, that uses many of the steps of FIG. 3 and the random number generators 230, 232, 234, and 235 to further encrypt the input data 208 during the compression operations in order to increase the security of the encoded output data 12. Control begins at block 300 where the encoder 204 begins the process of encoding the input data 208. The encoder 204 receives (at block 302) the scrambled MRU key 210, initializes the MRU list 220 with the content of the received MRU key 210, and seeds all four random number generators 230, 232, 234, and 235 with one or more bits from the MRU key 210. Seeding the pseudo random number generators 230, 232, 234, and 235 with the MRU key 210, which is itself secure, further obstructs third parties from decoding the output data 212. At block 306, the encoder 4 then scans a string from the input data stream 208 and generates (at block 308) a copy pointer or MRU reference for literals included in the string according to steps 52 through 68 in FIG. 3.

If (at block 310) an MRU reference was generated for a literal, then the encoder 204 generates (at block 312) a single binary random number from the first pseudo-random number generator. If (at block 314) the generated binary random number is one, then the encoder 204 performs step 74 in FIG. 3 to promote the accessed value to the top of the MRU list 220. Using the random number generator to determine whether to update the MRU list 220 makes the compressed data stream more difficult to decode than a simple cryptogram.

Otherwise, from the "no" branch of FIG. 314 or 316, the encoder 204 generates (at block 318) a random number from the pseudo random number generator 318. To provide an additional layer of security, the encoder 204 uses one (or more) pseudo random generators 232 to generate at least three bits (in block 318) which will be used in an exclusive OR (XOR) operation (at block 320) with at least M bits, where M is at least the first 3 bits of any output compression codeword in block 320, be that codeword a literal or copy pointer. In the limit all bits of every codeword are XOR'd with a pseudo-random number generator before that codeword is sent (at block 322) on to the bit packer. If there are further input bytes to process after handling the last byte, control proceeds back to block 306.

Figure 8:
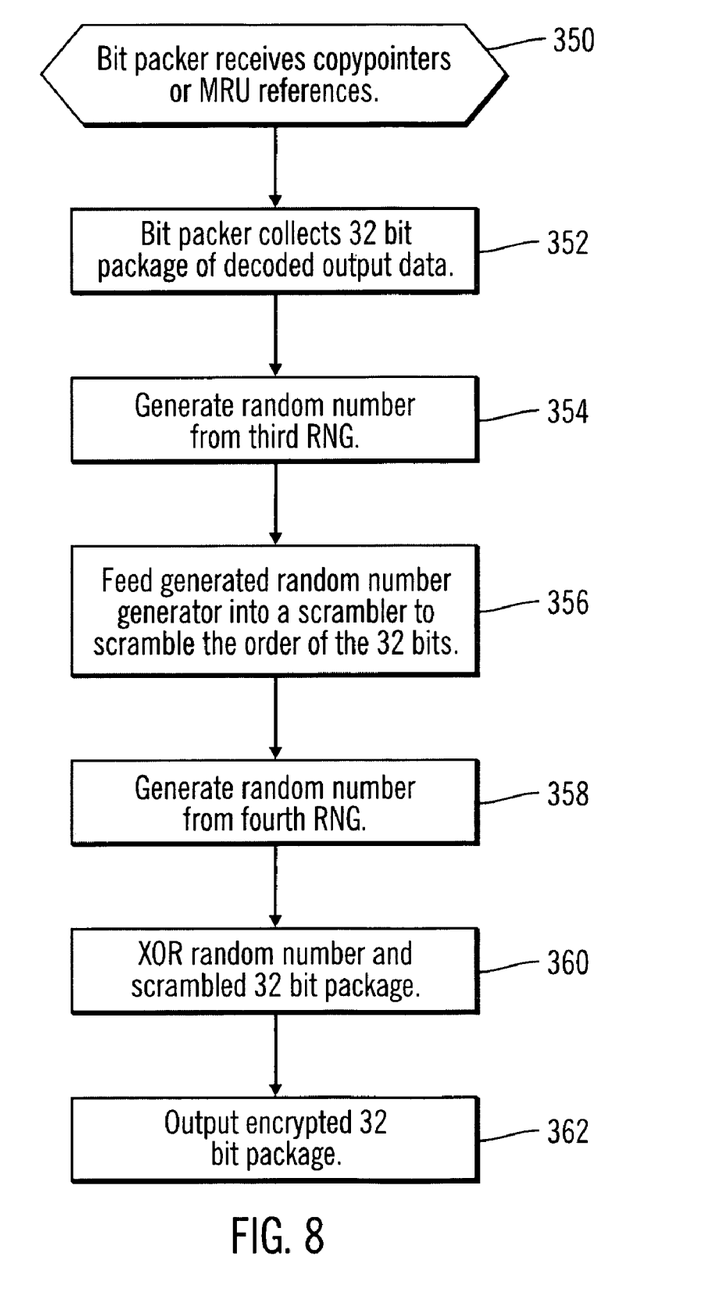

FIG. 8 illustrates the operations performed by the bit packer 236 upon receiving (at block 350) the copy pointers or MRU references from the encoder logic 204. The bit packer 236 collects (at block 352) compression codewords until N (e.g. 32, as will be assumed below) contiguous bits of the compressed data stream exist which can be output at one time. Certain special conditions, such as the end of a record, or operations may cause all bits in the bit packer to be output even when there are not 32 valid bits—in this case the as yet undefined bits can be set to some default value, such as binary '0's, or they can be set to some part of a random number. In either case, the output of the bit packer is 32 bit segments of the compressed data stream. Each 32 bit output of the bit packer is then encrypted in two ways.

First, random number generator (RNG) 234 generates (at block 354) a pseudo random number. The scrambler 238 rearranges (at block 356) the ordering of the 32 bits according to the value of the generated pseudo-random number, which may be different for each 32 bit scramble, in a manner known in the art. There are 32 factorial (32!) possible unique bit reorderings (scrambles) of any 32 bit word. However, in certain implementations, the scrambler 238 may only allow only a small subset of these. For instance, the number of allowed scrambles or orders may be defined by the number of possible combinations of the input pseudo-random number (e.g. if the pseudo-random number used to scramble the 32 bit package is itself 32 bits long then there are only roughly 4 billion scrambles possible. However, in the prior art, a simple any bit to any bit scrambler uses 80 bits, which can represent a huge number, though this is still a significantly smaller number than 32 factorial).

Second, random number generator (RNG) 235 generates a further random number that is XOR'd (at block 360) with the scrambled 32 bit package. Alternatively, the random number generator 234 may be used to generate the random number XOR'd with the scrambled 32 bit package. The combination of the scrambling in response to a pseudo-random number generated by 234 and the XOR generated by 235 is to create an encrypted compressed data stream. In further implementations, the scramble and XOR operations on the 32 bit package may be performed some number of times beyond the first time. In such implementations, a new pseudo-random can be used for each iteration by either re-use of the same random number generator to generate a new number, or by use of a separate random number generator. Similarly the scrambling and XOR'ing can be done with separate circuits or by re-use of the same circuits one further time per iteration.

Finally after the scramble and XOR operations have been performed some number of times, there are recording techniques such as those described in the LTO tape format, where locations within the decompressed data stream where decompression can begin, known as access points, are stored as the compressed data stream is created. These access points themselves can be encrypted such that the start locations within the compressed data stream are unknown. Similarly the valid data length within a data set denotes the end of a compressed data stream and this too can be encoded. Since access points and valid data lengths are typically recorded in an information table such as a Data Set Information Table (DSIT) in the LTO format, they can be software encrypted so that neither the start or stop location within data sets are known. These software encryptors can be pseudo-random number algorithms which use as a seed some set of bits or bytes gathered from the 256 byte key.

Figure 9:
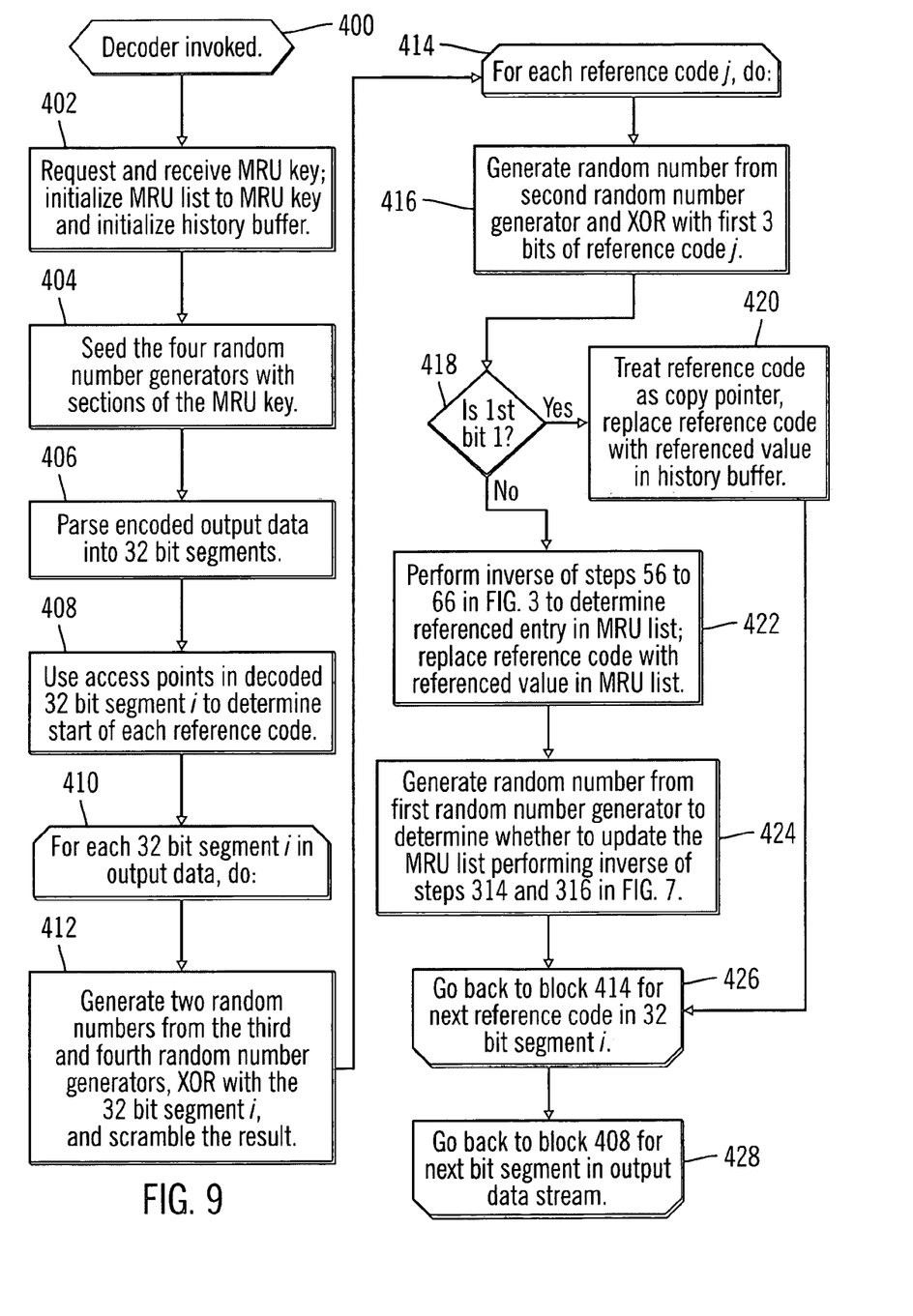
FIG. 9 illustrates logic to decode data encoded by the logic of FIGS. 7 and 8 in accordance with implementations of the invention.

FIG. 9 illustrates logic implemented in the decoder 206 to use the same MRU key 10 and random number generators 230, 232, 234, and 235 to perform the inverse of the operations described with respect to FIGS. 7 and 8. In response to being invoked (at block 400), the decoder 206 would request and receive (at block 402) the MRU key 10 and seed the initial MRU list 220 with the content of the received MRU key 10. The four pseudo random number generators 230, 232, 234, and 235 are then seeded (at block 404) with sections from the MRU key 10 in the same manner performed at step 304 (FIG. 7). The encoded output data 212 is then parsed (at block 406) into 32 bit segments. The access points in the 32 bit segment i are used (at block 408) to determine the start of each reference code, i.e., a copy pointer or MRU reference, in segment i. A loop is performed at blocks 410 through 428 for each 32 bit segment i. At block 412, the decoder logic 206 generates two random numbers from the third and fourth random number generators 234, 235 and performs an exclusive OR (XOR) of the random number and the 32 bit segment i to decode the 32 bit segment and obtain the access points therein.

For each segment i, a loop is performed at blocks 414 through 426 to decode/decrypt each reference code j in segment i. At block 416, the decoder 206 uses the second random number generator 232 to generate a random number and exclusive OR (XOR) with the first three bits of reference code j to enable determination as to whether the reference code j is a copy pointer, indicated by a "1" in the first bit or a MRU reference, indicated by a "00", "010" or "011" in the first three bits. If (at block 418) the first bit is a "1", then the decoder 206 treats the reference code as a copy pointer and uses (at block 420) the copy pointer to replace the reference code j with the referenced value in the history buffer 222 in a manner known in the LZ1 art. Otherwise, the decoder 206 performs (at block 422) the inverse of steps 56 to 66 in FIG. 3 to determine the referenced entry in the MRU list 220 and replace the reference code j with the byte at the determined entry. The decoder 206 would further generate (at block 424) a random number from the first pseudo random number generator 230 to determine whether to update the MRU list 220 by performing the inverse of steps 314 and 316 in FIG. 7.

The logic of FIGS. 7 and 8 provide further security by using the secret MRU key 10 to seed random number generators to further encrypt the copy pointers and MRU references. The above operations involving the use of pseudo random generators 230, 232, 234, 235 to further randomize the following information: the manner in which the MRU list 20 is updated; the first three bits of each copy pointer and MRU reference to prevent parsing the output data 12 stream to determine the start of each copy pointer or MRU reference; and randomizes the entire output of each 32 bit package. To further increase the strength of the encryption, each random number generator 230, 232, 234, and 235 may use a different pseudo random number generator algorithm. The logic of FIGS. 7 and 8 optimizes the encryption of the data by generating and using random numbers to encrypt data during the compression operations performed on a byte-by-byte basis.

The further techniques of the described implementations using random numbers requires knowledge of the decoder logic 206 and specific algorithms of the pseudo random number generators 230, 232, 234, and 235, as well as knowledge of which bits from the MRU key 10 are used to seed the random number generators, before decryption can even be attempted. Moreover, even if such knowledge of the operation of the decoder 206 could be obtained, a third party attempting to break the encryption performed by the logic of FIGS. 7 and 8 would still have to guess the value of the 256 byte MRU key, which has 256 factorial (256!) permutations.

ADDITIONAL IMPLEMENTATION DETAILS

The described implementations of an encoder and decoder include a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations, strings were replaced with copy pointers, or references to matching string values, and the remaining input data comprised literal bytes replaced with references to the MRU list. The literal may comprise more or less bits than a byte.

In the described implementations, the LZ1 algorithm was used to encode strings matching strings in the history buffer and an updateable MRU list was used to encode the literals. In alternative implementations, different compression algorithms may be used. For instance, LZ2 may be used to encode values matching a dictionary of entries. In LZ2 implementations, strings in the input data would be replaced with references to the dictionary instead of a copy pointer to a previous instance of the string in the history buffer. Still further, alternative compression algorithms may be used to code certain of the strings and the MRU list to encode other of the strings left as literals.

In the logic of FIGS. 7 and 8, random number generators were used to randomize output in four different instances. In alternative implementations, the discussed random number generators may be used in only one or two of the above described locations, or to randomize additional of the output data or operations.

In further implementations, additional encrypting operations may be performed using the described or additional random number generators. For instance, the encoder or software may encrypt access points and valid data lengths. Such encryption may involve scrambling data in response to generated pseudo-random numbers as well as XOR'ing the scrambled data with a further pseudo random number. Further, the scrambling and XOR combination may be repeated a number of times against the same item. Still further, an additional random number generator may be used to fill out padding bits and other bits which would otherwise go to some default. For instance, the displacement field of Copy Pointers output in the first 512 bytes from the beginning of a Compressed Data Stream or from an access point has one or more bits which must be '0' because the 10 bit Displacement field is addressing a valid history buffer which could logically be addressed by fewer bits—and thus the high order bit(s) are zero.

In the described implementations, the list used to encode the literals comprised an MRU list 20 (in FIG. 1 and list 220 in FIG. 6) where accessed entries were moved to the top of the list. In alternative implementations, the lists 20, 220 maintaining the 256 byte entries may be implemented in other manners than an MRU.

In the described implementations, the input data was encoded on a byte-by-byte basis. In additional implementations, strings having different bit lengths than a byte may be subject to the encoding operations.

In the described implementations, the MRU list 20 (in FIG. 1 and list 220 in FIG. 6) was updated to promote an accessed entry to the top of the list after replacing one byte with a reference to the entry in the MRU list 20, 220. In alternative implementations, the MRU list 20, 220 may not be updated during encoding and decoding operations, or updated in alternative manners.

The described implementations prepended specific bit values to the copy pointer and MRU reference to distinguish between the reference code an MRU reference. In alternative implementations, different bit values may be used to identify the reference codes.

The preferred logic of FIGS. 3–5 and 7–9 describe specific operations occurring in a particular order. In alternative implementations, certain of the logic operations may be performed in a different order, modified or removed. Morever, steps may be added to the above described logic and still conform to the described implementations. Further, operations described herein may occur sequentially or certain operations may be processed in parallel.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for encoding and decoding input data, comprising:
   (a) generating a key comprising a list of a plurality of binary values, wherein the key is made available to a user to enable decoding;
   (b) encoding the input data by:
      (i) using the key to initialize a replacement list;
      (ii) determining whether to replace strings in the input data with a string reference to a matching string value, wherein the input data not replaced with reference to one matching string value comprises one or more literals;
      (iii) replacing each literal with a literal reference to one entry in the replacement list matching the literal; and
   (c) decoding the encoded input data by:
      (i) accessing the generated key in response to user input; and
      (ii) using the accessed key to decode the literals replaced with literal references to entries in the replacement list.

2. The method of claim 1, wherein the literal comprises a byte of the input data.

3. The method of claim 1, wherein the user input comprises the generated key transferred by the user to the decoder.

4. The method of claim 1, wherein the user input comprises a password, further comprising:
   using the password to generate the key used to initialize the replacement list during encoding.

5. The method of claim 1, wherein each string reference comprises a copy pointer to a previous instance of the string in a history buffer generated while scanning the input data.

6. The method of claim 1, wherein each string reference addresses one entry in a compression dictionary comprising strings repeated in the input data.

7. The method of claim 1, wherein during encoding all the input data is replaced with one string reference or literal reference.

8. The method of claim 1, wherein the replacement list includes 256 entries having every possible permutation of a byte.

9. The method of claim 1, wherein generating the key further comprises:
   randomizing an order of the entries in the replacement list.

10. The method of claim 1, wherein the replacement list comprises a most recently used (MRU) list, and wherein after replacing one literal with one literal reference to one entry in the replacement list during encoding further performing:
    promoting the entry matching the replaced literal to a first entry in the replacement list.

11. The method of claim 1, wherein after replacing one literal with the literal reference to one entry in the replacement list during encoding, further performing:
    generating a pseudo random number; and
    using the pseudo random number to determine whether to promote the entry matching the replaced literal to a first entry in the replacement list.

12. The method of claim 1, wherein a first binary value is prepended to each string reference in the encoded data and a second binary value is prepended to the literal references in the encoded data.

13. The method of claim 12, wherein encoding the input data further comprises:
    generating a pseudo random number; and
    using the generated pseudo random number to encrypt at least one prepended first or second binary value.

14. The method of claim 1, wherein a first binary value is prepended to each string reference in the encoded data and wherein one of a plurality of different binary values is prepended to each literal reference in the encoded data, wherein each of the plurality of binary values prepended to literal references corresponds to a section of the replacement list and wherein the literal reference references one entry in the section corresponding to the prepended binary value.

15. The method of claim 1, further comprising:
    adding a number of bits from the encoded input data having a plurality of the references to either the matching string value in the input data or the replacement list to one bit package; and
    for each bit package including, performing:
       (i) generating a pseudo random number; and
       (ii) using the generated pseudo random number to encrypt the bit package including the encoded input data.

16. The method of claim 1, wherein encoding the input data further comprises:
    using at least one random number generator to generate random numbers to encrypt the encoded input data; and
    using the at least one random number generator to generator random numbers to decrypt the encoded data.

17. A system for encoding and decoding input data, comprising:
    (a) means for generating a key comprising a list of a plurality of binary values, wherein the key is made available to a user to enable decoding;
    (b) means for encoding the input data by:
       (i) using the key to initialize a replacement list;
       (ii) determining whether to replace strings in the input data with a string reference to a matching string value, wherein the input data not replaced with reference to one matching string value comprises one or more literals;
       (iii) replacing each literal with a literal reference to one entry in the replacement list matching the literal; and
    (c) means for decoding the encoded input data by:
       (i) accessing the generated key in response to user input; and
       (ii) using the accessed key to decode the literals replaced with literal references to entries in the replacement list.

18. The system of claim 17, wherein the means for encoding the input data further performs after replacing one literal with the literal reference to one entry in the replacement list during encoding:
    generating a pseudo random number; and
    using the pseudo random number to determine whether to promote the entry matching the replaced literal to a first entry in the replacement list.

19. The system of claim 17, wherein the means for encoding the input data further performs prepending a first binary value to each string reference in the encoded data and prepending a second binary value to the literal references in the encoded data.

20. The system of claim 17, wherein encoding the input data further performs:
  using at least one random number generator to generate random numbers to encrypt the encoded input data; and
  using the at least one random number generator to generator random numbers to decrypt the encoded data.

21. An article of manufacture including code for encoding and decoding input data, wherein the code causes operations to be performed comprising:
  (a) generating a key comprising a list of a plurality of binary values, wherein the key is made available to a user to enable decoding;
  (b) encoding the input data by:
    (i) using the key to initialize a replacement list;
    (ii) determining whether to replace strings in the input data with a string reference to a matching string value, wherein the input data not replaced with reference to one matching string value comprises one or more literals;
    (iii) replacing each literal with a literal reference to one entry in the replacement list matching the literal; and
  (c) decoding the encoded input data by:
    (i) accessing the generated key in response to user input; and
    (ii) using the accessed key to decode the literals replaced with literal references to entries in the replacement list.

22. The article of manufacture of claim 21, wherein the literal comprises a byte of the input data.

23. The article of manufacture of claim 21, wherein the user input comprises the generated key transferred by the user to the decoder.

24. The article of manufacture of claim 21, wherein the user input comprises a password, further comprising:
  using the password to generate the key used to initialize the replacement list during encoding.

25. The article of manufacture of claim 21, wherein each string reference comprises a copy pointer to a previous instance of the string in a history buffer generated while scanning the input data.

26. The article of manufacture of claim 21, wherein each string reference addresses one entry in a compression dictionary comprising strings repeated in the input data.

27. The article of manufacture of claim 21, wherein during encoding all the input data is replaced with one string reference or literal reference.

28. The article of manufacture of claim 21, wherein the replacement list includes 256 entries having every possible permutation of a byte.

29. The article of manufacture of claim 21, wherein generating the key further comprises:
  randomizing an order of the entries in the replacement list.

30. The article of manufacture of claim 21, wherein the replacement list comprises a most recently used (MRU) list, and wherein after replacing one literal with one literal reference to one entry in the replacement list during encoding further performing:
  promoting the entry matching the replaced literal to a first entry in the replacement list.

31. The article of manufacture of claim 21, wherein after replacing one literal with the literal reference to one entry in the replacement list during encoding, further performing:
  generating a pseudo random number; and
  using the pseudo random number to determine whether to promote the entry matching the replaced literal to a first entry in the replacement list.

32. The article of manufacture of claim 21, wherein a first binary value is prepended to each string reference in the encoded data and a second binary value is prepended to the literal references in the encoded data.

33. The article of manufacture of claim 32, wherein encoding the input data further comprises:
  generating a pseudo random number; and
  using the generated pseudo random number to encrypt at least one prepended first or second binary value.

34. The article of manufacture of claim 21, wherein a first binary value is prepended to each string reference in the encoded data and wherein one of a plurality of different binary values is prepended to each literal reference in the encoded data, wherein each of the plurality of binary values prepended to literal references corresponds to a section of the replacement list and wherein the literal reference references one entry in the section corresponding to the prepended binary value.

35. The article of manufacture of claim 21, further comprising:
  adding a number of bits from the encoded input data having a plurality of the references to either the matching string value in the input data or the replacement list, to one bit package; and
  for each bit package including, performing:
    (i) generating a pseudo random number; and
    (ii) using the generated pseudo random number to encrypt the bit package including the encoded input data.

36. The article of manufacture of claim 21, wherein encoding the input data further comprises:
  using at least one random number generator to generate random numbers to encrypt the encoded input data; and
  using the at least one random number generator to generator random numbers to decrypt the encoded data.

* * * * *